(12) United States Patent
Liu et al.

(10) Patent No.: US 10,935,713 B2
(45) Date of Patent: Mar. 2, 2021

(54) UNITARY LIGHTGUIDE

(71) Applicant: 3M INNOVATIVE PROPERTIES COMPANY, St. Paul, MN (US)

(72) Inventors: Tao Liu, Woodbury, MN (US); Yongshang Lu, Woodbury, MN (US); David C. Mercord, Prescott, WI (US); Brian W. Ostlie, Hudson, WI (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 16/624,626

(22) PCT Filed: Jun. 25, 2018

(86) PCT No.: PCT/IB2018/054674
§ 371 (c)(1),
(2) Date: Dec. 19, 2019

(87) PCT Pub. No.: WO2019/003087
PCT Pub. Date: Jan. 3, 2019

(65) Prior Publication Data
US 2020/0132909 A1  Apr. 30, 2020

Related U.S. Application Data

(60) Provisional application No. 62/525,292, filed on Jun. 27, 2017.

(51) Int. Cl.
*F21V 8/00* (2006.01)
(52) U.S. Cl.
CPC ......... *G02B 6/0036* (2013.01); *G02B 6/0018* (2013.01); *G02B 6/0028* (2013.01); *G02B 6/0038* (2013.01); *G02B 6/0075* (2013.01)

(58) Field of Classification Search
CPC .. G02B 6/0021; G02B 6/0038; G02B 6/0073; G02B 6/0053; G02B 5/045
See application file for complete search history.

(56) References Cited

U.S. PATENT DOCUMENTS

| 8,358,266 B2 | 1/2013 | Khazeni | |
|---|---|---|---|
| 2001/0019379 A1* | 9/2001 | Ishihara | G02B 6/0036 349/65 |

(Continued)

OTHER PUBLICATIONS

International Search Report for PCT International Application No. PCT/IB2018/054674, dated Oct. 18, 2018, 4 pages.

*Primary Examiner* — Evan P Dzierzynski
(74) *Attorney, Agent, or Firm* — Jonathan L. Tolstedt

(57) ABSTRACT

A unitary lightguide including a first lightguide section extending along a first direction and a second lightguide section extending along a second direction is described. The second lightguide section includes a plurality of light extractors for extracting light that would otherwise propagate within and along the second lightguide section. The unitary lightguide includes a boundary region disposed between and joining the first and second lightguide sections and including a plurality of spaced apart light redirecting features. Each light redirecting feature includes a first portion extending substantially parallel to the first direction, and a second portion extending from proximate the first end of the first portion toward the second lightguide section and making an angle with the first portion in a range from about 10 degrees to about 70 degrees.

20 Claims, 7 Drawing Sheets

(56) References Cited

U.S. PATENT DOCUMENTS

| | | | |
|---|---|---|---|
| 2006/0157180 A1 | 7/2006 | Tanno | |
| 2010/0053939 A1* | 3/2010 | Fan | G02B 6/0025 |
| | | | 362/97.3 |
| 2012/0314445 A1* | 12/2012 | Masuda | G02B 6/0008 |
| | | | 362/581 |
| 2014/0063853 A1 | 3/2014 | Nichol | |
| 2015/0168628 A1* | 6/2015 | Niu | G02B 6/3508 |
| | | | 362/602 |
| 2015/0219836 A1* | 8/2015 | York | G02B 6/0073 |
| | | | 349/65 |
| 2015/0253488 A1 | 9/2015 | Wilcox | |
| 2019/0154903 A1* | 5/2019 | Takata | G02B 6/0035 |
| 2019/0324183 A1* | 10/2019 | Shinohara | G02B 5/10 |

* cited by examiner

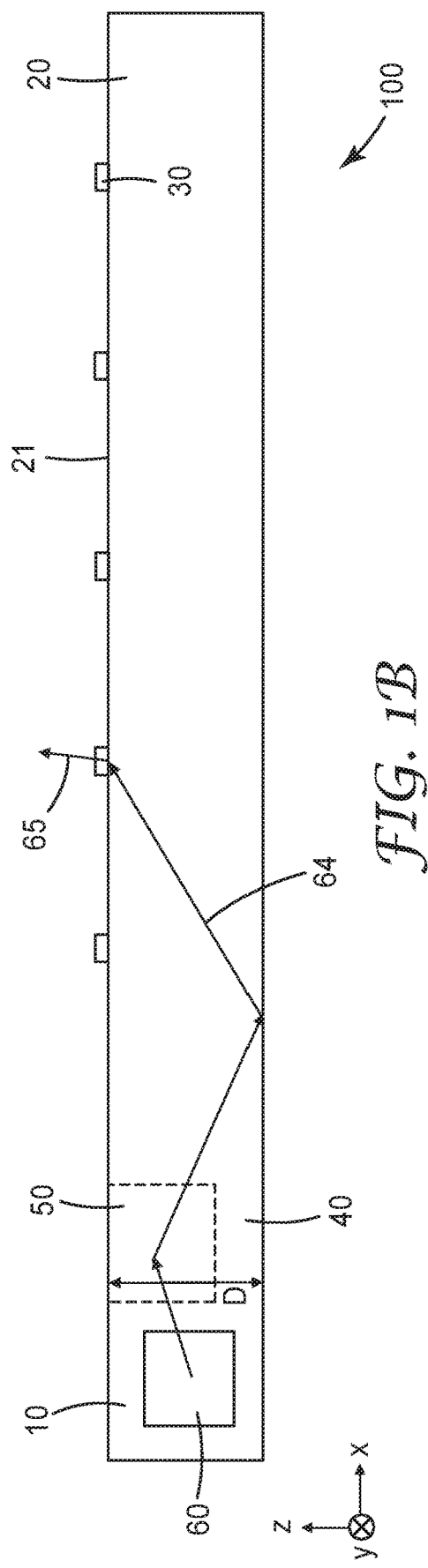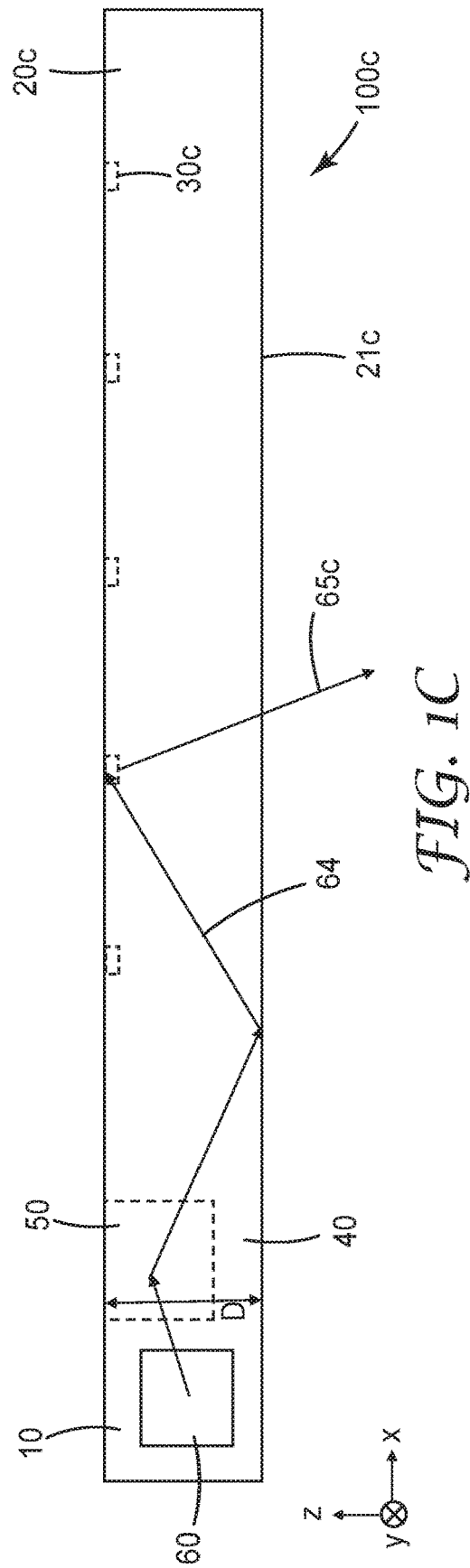

UNITARY LIGHTGUIDE

BACKGROUND

Lightguides can be used to provide illumination for various applications. For example, lightguides have been used in display backlights, general lighting, and automotive tail lamps. A plurality of light sources may be distributed along an edge of the lightguide to provide light into the lightguide, and the lightguide may include light extraction features for extracting the light from the lightguide.

SUMMARY

In some aspects of the present description, a unitary lightguide extending along mutually orthogonal first and second directions is provided. The lightguide includes a first lightguide section extending along the first direction between opposing first and second ends of the first lightguide section and having a minimum length L1 along the first direction and a maximum width W1 along the second direction, where L1/W1≥10; a second lightguide section extending along the second direction; and a boundary region disposed between and joining the first and second lightguide sections. The second lightguide section has a minimum length L2 along the second direction and a maximum width W2 along the first direction. The second lightguide section includes a plurality of light extractors for extracting light that would otherwise propagate within and along the second lightguide section. The boundary region is substantially coextensive in length with the length of the first lightguide section and the width of the second lightguide section. The boundary region includes a plurality of spaced apart light redirecting features. Each light redirecting feature includes a first portion extending substantially parallel to the first direction between first and second ends of the first portion; and a second portion extending from proximate the first end of the first portion toward the second lightguide section between first and second ends of the second portion and making an angle with the first portion in a range from about 10 degrees to about 70 degrees. The lightguide has a unitary construction.

In some aspects of the present description, a unitary lightguide is provided. The unitary lightguide includes a first lightguide section having a major surface having an area A1; a second lightguide section having a major surface having an area A2≥A1; and a row of spaced apart light redirecting features formed in the unitary lightguide and separating the first and second lightguide sections from each other. Each light redirecting feature has a polygonal prism shape having a plurality of sides. Each side of the polygonal prism is substantially planar and makes an angle of less than about 20 degrees with a normal to the unitary lightguide.

In some aspects of the present description, a unitary lightguide is provided. The unitary lightguide includes a row of spaced apart first light redirecting recesses formed in the unitary lightguide spaced from and generally along a first edge of the unitary lightguide. The first light redirecting recesses divide the lightguide into a first lightguide section having a major surface having an area A1 and a second lightguide section having a major surface having an area A2≥A1. Each first light redirecting recess includes first and second adjacent sides. Each side is substantially perpendicular to the unitary lightguide and extends into the unitary lightguide to a depth that is at least 0.5 times a local thickness of the unitary lightguide. The first, but not the second, side is substantially parallel to the first edge.

BRIEF DESCRIPTION OF THE DRAWINGS

FIG. 1B is a schematic side view of the lightguide of FIG. 1A;
FIG. 1C is a schematic side view of a lightguide.

DETAILED DESCRIPTION

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

Two-dimensional (2D) area lightguides have been used for surface lighting in applications such as display backlights, general lighting, and automotive tail lamps, for example. Multiple light emitting diodes (LEDs) are typically arranged along one or two ends of the area lightguide for light injection. The number of LEDs and their spacing are typically determined by the total amount of light and spatial uniformity needed for a given application. In this approach, the LEDs are typically installed directly adjacent to the lightguide and light is input into the lightguide via butt-coupling. Assembly of such systems can be complex, especially when using flexible lightguides, and the cost can be high due to the number of LEDs needed.

According to some embodiments of the present description, lightguides described herein can be used to provide spatially uniform lighting over a 2-dimensional area using, for example, only one or two light sources. The light source(s) can be installed remotely from the lightguide so that the associated electronics can be separated from the lightguide. The lightguide may include a first section and a second section and a row of light redirecting features separating the first and second sections. The light redirecting features may include a first portion or side that directs a portion of a light input into a first end of the first section generally towards an opposite second end of the first section and/or generally between an edge of the lightguide and the row of the light redirecting features. The light redirecting features may further include a second portion or side that directs a portion of the light towards and into the second section of the lightguide. The light redirecting features may further include a third portion or side that directs a portion of light received from the second end of the first section towards and into the second section of the lightguide. The second section of the lightguide may include light extractors for extracting light that would otherwise propagate within the lightguide via total internal reflection (TIR). The lightguide may be a unitary construction and may be made from a film by cutting recesses into the lightguide to form the light redirecting features and the light extractors.

Figure 1A:
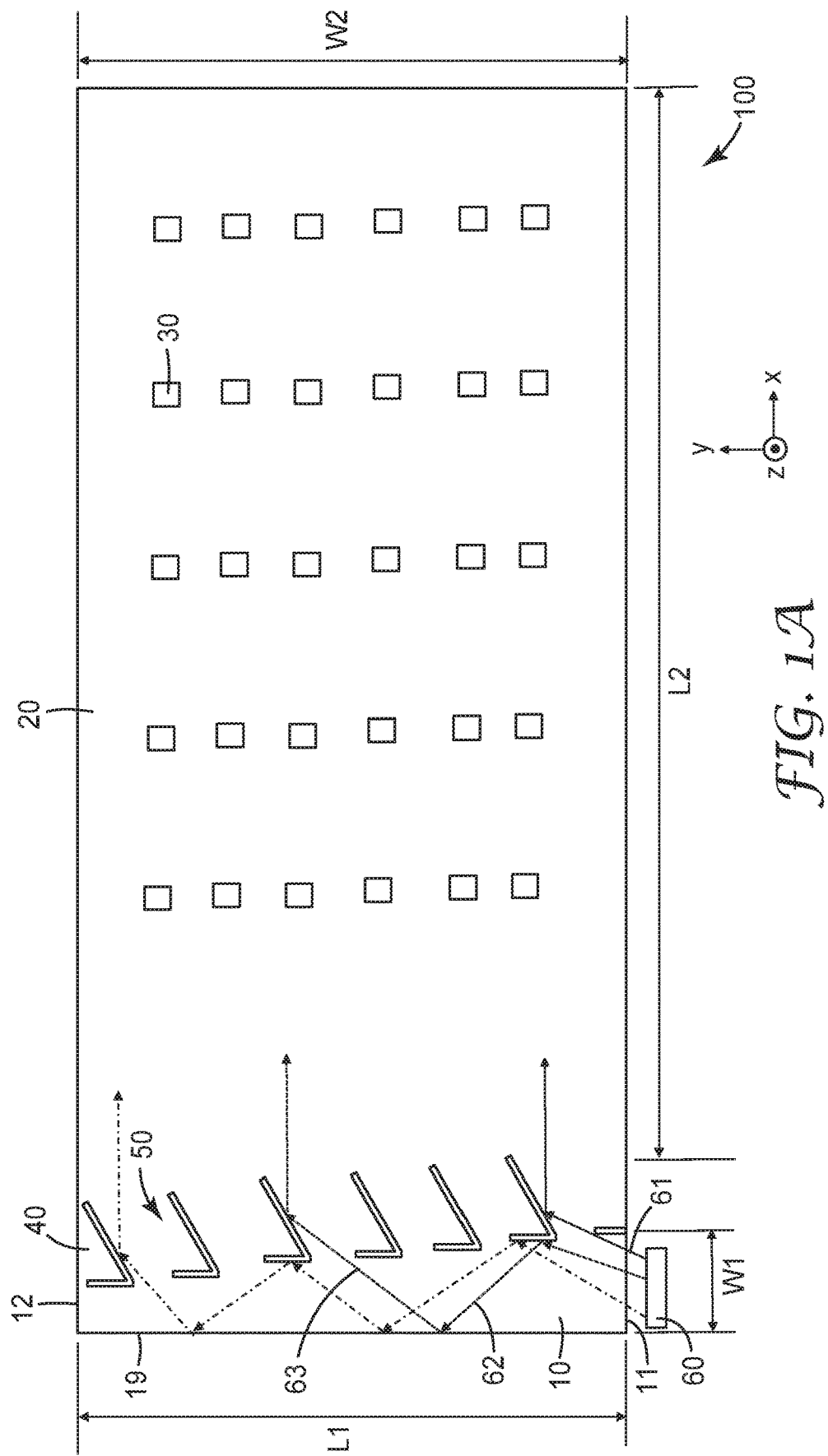
FIG. 1A is a schematic top view of a lightguide.

FIGS. 1A-1B are schematic top and side views, respectively, of a lightguide 100 extending along mutually orthogonal first and second directions (y- and x-directions, respectively). Lightguide 100 has a unitary construction and includes a first lightguide section 10 extending along the first direction between opposing first and second ends 11 and 12 of the first lightguide section 10 and having a minimum length L1 along the first direction and a maximum width W1 along the second direction. In some embodiments, the first lightguide section 10 is tapered so that the maximum width W1 occurs at an end 11 of the first lightguide section. In some embodiments, L1/W1 is greater than or equal to 10. Lightguide 100 further includes a second lightguide section 20 extending along the second direction (x-direction) and having a minimum length L2 along the second direction and a maximum width W2 along the first direction (y-direction). Second lightguide section 20 includes a plurality of light extractors 30 for extracting light that would otherwise propagate within and along the second lightguide section 20. For example, light 64 depicted in FIG. 1B is extracted as light 65. Lightguide 100 further includes a boundary region 40 disposed between and joining the first and second lightguide sections 10 and 20. The boundary region 40 is substantially coextensive in length with the length L1 of the first lightguide section 10 and the width W2 of the second lightguide section 20. The boundary region 40 includes a plurality of spaced apart light redirecting features 50. In the illustrated embodiment, first lightguide section 10 is disposed proximate a first edge 19 of the lightguide 100. An alternate embodiment is illustrated in FIG. 1C which is described further elsewhere herein.

A region may be described as substantially coextensive with a length or a width if the region is coextensive with the length or width over greater than 50% of the length or width, respectively. A region described as substantially coextensive with a length or a width may be coextensive with the length or width over greater than 60%, or greater than 70%, or greater than 90%, or greater than 95%, of the length or width, respectively. A region described as substantially coextensive with a length or a width may be coextensive with the entire length or width.

Figure 2A:
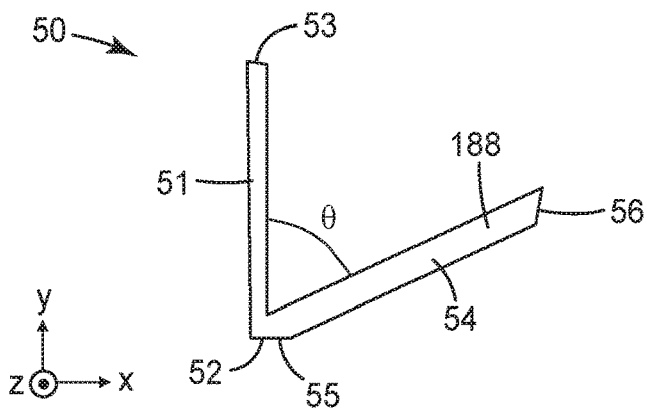
FIGS. 2A-2B are top views of a light redirecting feature.
Figure 2B:
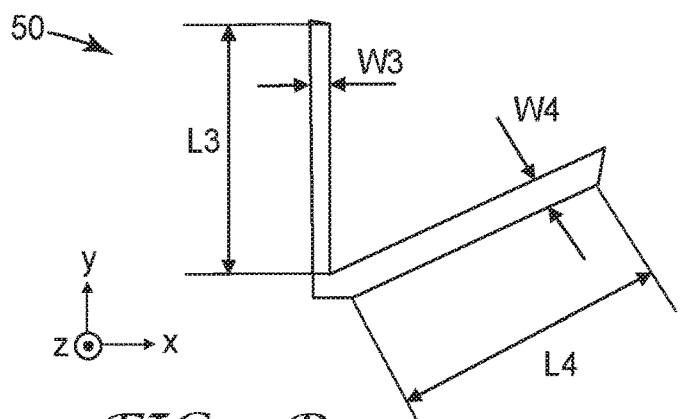
Figure 2C:
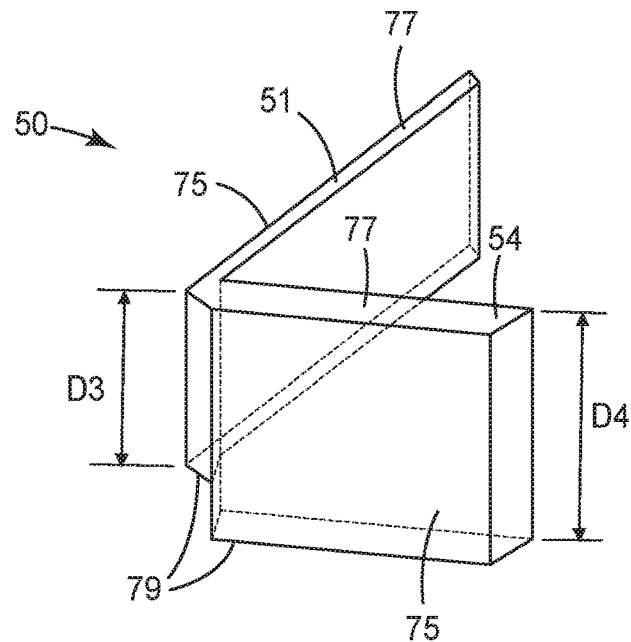
FIG. 2C is a perspective view of the light redirecting feature of FIGS. 2A-2B.

A light redirecting feature 50 is illustrated in FIGS. 2A-2C. FIGS. 2A-2B are schematic top views of the light redirecting feature 50 and FIG. 2C is a schematic perspective view of the light redirecting feature 50. Light redirecting feature 50 includes a first portion 51 extending substantially parallel to the first direction (y-direction) between first 52 and second 53 ends of the first portion 51, and includes a second portion 54 extending from proximate the first end 52 of the first portion 51 toward a second lightguide section (e.g., second lightguide section 20) between first and second ends 55 and 56 of the second portion 54. The second portion 54 makes an angle $\theta$ with the first portion 51. In some embodiments, the angle $\theta$ is in a range from about 10 degrees to about 70 degrees. In some embodiments, the angle $\theta$ is greater than about 20 degrees. As described further elsewhere herein, in some embodiments, the light redirecting feature 50 has a prism shape including first and second bases 77 and 79 and a plurality of sides 75. In some embodiments, at least one of the sides 75 is a substantially vertically oriented, planar or substantially planar surface making an angle of less than about 20 degrees with a normal (z-direction) to the unitary lightguide.

Light redirecting feature 50 may be or may include a recess in the lightguide which is optionally at least partially filled with a material 188. Material 188 may be a filler material having an index of refraction of n2 which is less than an index of refraction n1 of the boundary region 40. The index of refraction n1 of the boundary region may be the index of refraction of the material from which the unitary lightguide is formed. In some embodiments, n1-n2 is greater than about 0.05, or greater than about 0.1. In some embodiments, material 188 is air. One or both the first and second portions 51 and 54 may be at least partially filled with filler material. The index of refraction refers to the index of refraction at 532 nm unless indicated otherwise.

In some embodiments, a light source 60 is disposed at the first end 11 of the first lightguide section 10 as illustrated in FIG. 1A. In some embodiments, when light 61 emitted by the light source 60 enters the unitary lightguide 100 from the first end 11 of the first lightguide section 10, the first portions 51 of the light redirecting features 50 direct the entered light toward the second end 12 of the first lightguide section 110 (e.g., as redirected light 62), and the second portions 54 of the light redirecting features 50 direct the entered light toward and into the second lightguide section 20 (e.g., light 63 is redirected by a second portion 54 toward and into the second lightguide section 20). In some embodiments, the light extractors 30 extract light propagating within the second lightguide section 20 (e.g., light 64 depicted in FIG. 1B is extracted as extracted light 65), such that the extracted light 65 exits the unitary lightguide 100 from an emission surface 21 of the second lightguide section 20.

In some embodiments, the first portion 51 of each light redirecting feature 50 is a recess in the boundary region 40 of the unitary lightguide 100, where the recess has a minimum length L3 between the first and second ends 52 and 53 of the first portion 51, a maximum width W3, and a minimum depth D3 along a thickness direction (z-direction) of the unitary lightguide 100. In some embodiments, L3/W3 is greater than or equal to 1, or greater than or equal to 2, or greater than or equal to 5, or greater than or equal to 7, or greater than or equal to 10. In some embodiments, D3/W3 is greater than or equal to 1, or greater than or equal to 2, greater than or equal to 3, greater than or equal to 4, greater than or equal to 5.

In some embodiments, the second portion 54 of each light redirecting feature 50 is a recess in the boundary region 40 of the unitary lightguide 100, where the recess has a minimum length L4 between the first and second ends 55 and 56 of the second portion 54, a maximum width W4, and a minimum depth D4 along a thickness direction (z-direction) of the unitary lightguide 100. In some embodiments, L4/W4 is greater than or equal to 1, or greater than or equal to 2, or greater than or equal to 5, or greater than or equal to 7, or greater than or equal to 10. In some embodiments, D4/W4 is greater than or equal to 1, or greater than or equal to 2, greater than or equal to 3, greater than or equal to 4, greater than or equal to 5.

In some embodiments, one or both of the first and second portions 51 and 54 have a tapered depth so that the depth is a minimum at or near one end of the portion.

In some embodiments, a minimum thickness of the unitary lightguide 100 in the boundary region 40 is D. The minimum thickness is the minimum local thickness between the major surfaces of the lightguide 100 in the boundary region 40. In some embodiments, the lightguide 100 has a uniform thickness and the minimum thickness is the uniform thickness. In some embodiments, D3 is less than D.

In some embodiments, the first portion 51 of the light redirecting features 50 extends entirely through the thickness of the lightguide. In some embodiments, D4 is less than D. In some embodiments, the second portion 54 of the light redirecting features 50 extends entirely through the thickness of the lightguide. In some embodiments, each of D3 and D4 is at least 0.5, or at least 0.7, or at least 0.8, or at least 0.9 times D. In some embodiments, at least one of the light redirecting features 50 is a slot formed in the unitary lightguide 100.

In some embodiments, D3 and/or D4 are different for different light redirecting features 50. For example, in some embodiments, D3 and/or D4 is larger near the first end 11 and smaller near the second end 12. The distribution of D3 and/or D4 can be selected to provide a more uniform light output. In some embodiments, D3 and/or D4 are the same or about the same for each light redirecting features 50.

In some embodiments, one (12) of the first and second ends 11 and 12 of the first lightguide section 10 is smaller in length than the other one (11) of the first and second ends 11 and 12 of the first lightguide section 10. This may be due to the light redirecting features 50 being arranged at an angle relative to the y-axis or arranged on a curve, or it may be due to the shape of the first edge 19, for example. In other embodiments, the first and second ends 11 and 12 of the first lightguide section 10 have the same or about the same length.

Figure 3:
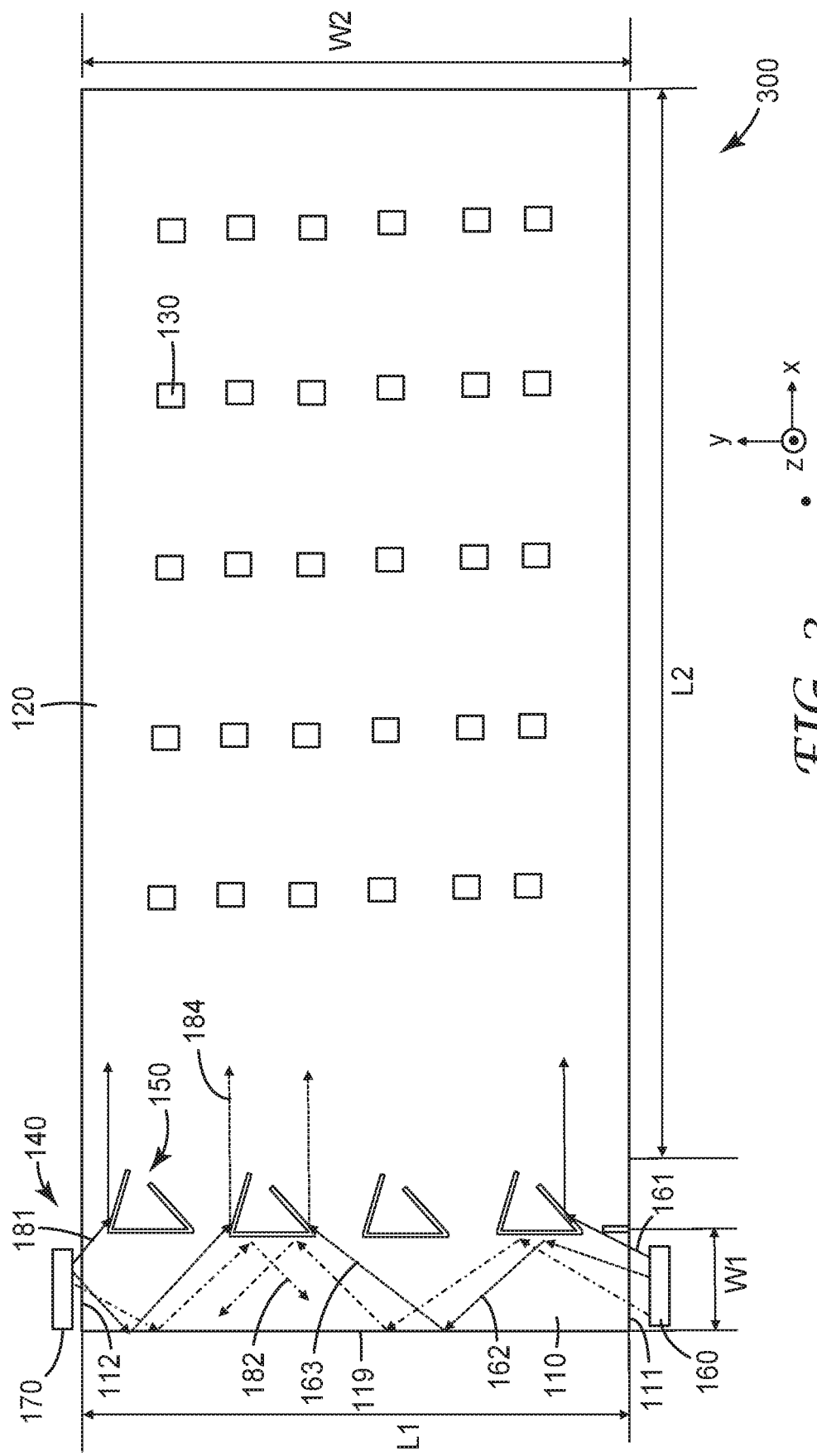
FIG. 3 is a schematic top view of a lightguide.

In some embodiments, a unitary lightguide includes a plurality of light redirecting features, each having a first portion adapted to direct light from a first end of a first lightguide section toward a second end of the first lightguide section, and a second portion adapted to extract light from the first lightguide section toward and into a second lightguide section. In some embodiments, the first portion is also adapted to direct light from the second end of the first lightguide section toward first end of the first lightguide section, and the light redirecting feature includes a third portion adapted to extract light from the first lightguide section toward and into the second lightguide section. In some embodiments, the second portion extracts light from the first lightguide section that is propagating predominately from the first end of the first lightguide section toward the second end of the first lightguide section, and the third portion extracts light from the first lightguide section that is propagating predominately from the second end of the first lightguide section toward the first end of the first lightguide section. FIG. 3 schematically illustrates a lightguide 300 including light redirecting features 150 having first, second and third portions.

FIG. 3 is a schematic top view of a lightguide 300 extending along mutually orthogonal first and second directions (y- and x-directions, respectively). Lightguide 300 is in many respects similar to lightguide 100 but includes light redirecting features 150 having a third portion 157 (see, e.g., FIG. 4A). Lightguide 300 includes a first lightguide section 110 extending along the first direction between opposing first and second ends 111 and 112 of the first lightguide section 110 and having a minimum length L1 along the first direction and a maximum width W1 along the second direction. Lightguide 300 further includes a second lightguide section 120 extending along the second direction (x-direction) and having a minimum length L2 along the second direction and a maximum width W2 along the first direction (y-direction). Second lightguide section 120 includes a plurality of light extractors 130 for extracting light that would otherwise propagate within and along the second lightguide section 120. Lightguide 300 further includes a boundary region 140 disposed between and joining the first and second lightguide sections 110 and 120. The boundary region 140 is substantially coextensive in length with the length of the first lightguide section 110 and the width of the second lightguide section 120. The boundary region 140 includes a plurality of spaced apart light redirecting features 150. The relationships between any of the lengths (e.g., L1, L2, L3, L4, W1, W2, W3, W4, D, D3, D4) of lightguide 300 may be as described for lightguide 100. In the illustrated embodiment, first lightguide section 110 is disposed proximate a first edge 119 of the lightguide 300.

Figure 4A:
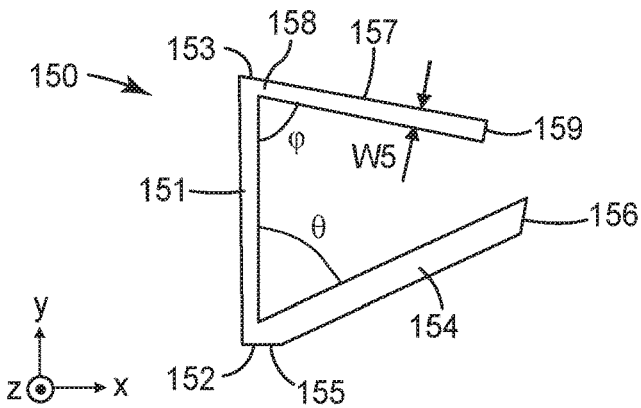
FIGS. 4A-4B are top views of a light redirecting feature.
Figure 4B:
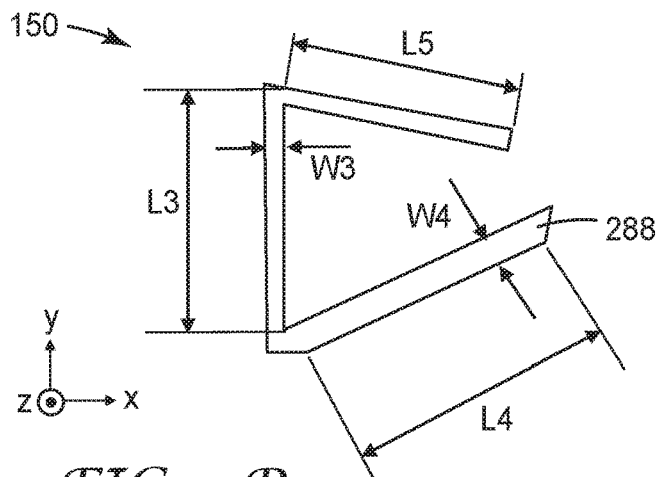
Figure 4C:
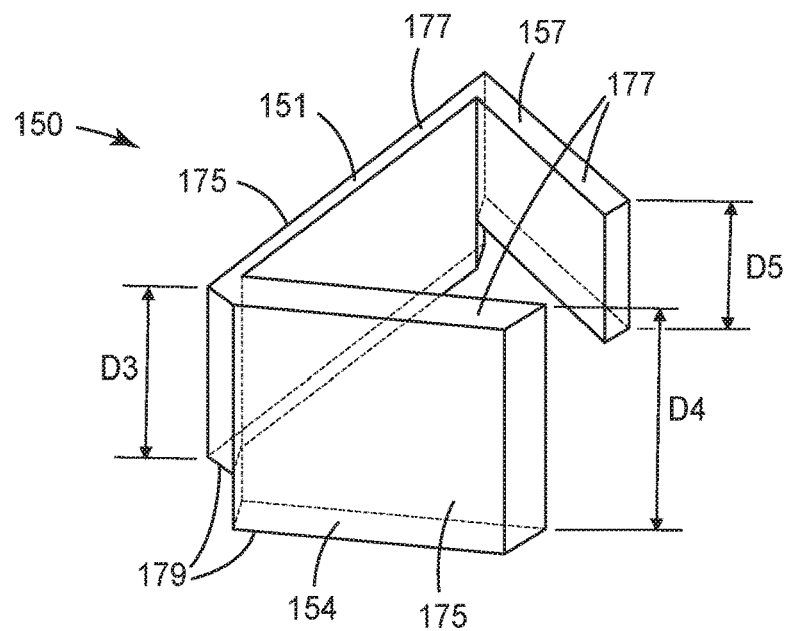
FIG. 4C is a perspective view of the light redirecting feature of FIGS. 4A-4B.

A light redirecting feature 150 is illustrated in FIGS. 4A-4C. FIGS. 4A-4B are schematic top views of the light redirecting feature 150 and FIG. 4C is a schematic perspective view of the light redirecting feature 150. Light redirecting feature 150 includes a first portion 151 extending substantially parallel to the first direction (y-direction) between first 152 and second 153 ends of the first portion 151, and includes a second portion 154 extending from proximate the first end 152 of the first portion 151 toward a second lightguide section (e.g., second lightguide section 120) between first and second ends 155 and 156 of the second portion 154. The second portion 154 makes an angle $\theta$ with the first portion 151. In some embodiments, the angle $\theta$ is in a range from about 10 degrees to about 70 degrees. In some embodiments, the angle $\theta$ is greater than about 20 degrees. Each light redirecting feature 150 further includes a third portion 157 extending from proximate the second end 153 of the first portion 151 toward the second lightguide section between first and second ends 158 and 159 of the third portion 157 and making angle $\varphi$ with the first portion 151. In some embodiments, the angle $\varphi$ is in a range from about 10 degrees to about 70 degrees. In some embodiments, the angle $\varphi$ is greater than 20 degrees. As described further elsewhere herein, in some embodiments, the light redirecting feature 150 has a prism shape including first and second bases 177 and 179 and a plurality of sides 175. In some embodiments, at least one of the sides 175 is a substantially vertically oriented, planar or substantially planar surface making an angle of less than about 20 degrees with a normal (z-direction) to the unitary lightguide.

In some embodiments, the first and/or second portions 151 and 154 of the light redirecting feature 150 is a recess in the boundary region 140 of the unitary lightguide 300 as described for unitary lightguide 100. In some embodiments, the third portion 157 of each light redirecting feature 150 is a recess in the boundary region 140 of the unitary lightguide 300, where the recess has a minimum length L5 between the first and second ends 158 and 159 of the third portion 157, a maximum width W5, and a minimum depth D5 along a thickness direction (z-direction) of the unitary lightguide 300. In some embodiments, L5/W5 is greater than or equal to 1, or greater than or equal to 2, or greater than or equal to 5, or greater than or equal to 7, or greater than or equal to 10. In some embodiments, D5/W5 is greater than or equal to 1, or greater than or equal to 2, greater than or equal to 3, greater than or equal to 4, greater than or equal to 5.

In some embodiments, a minimum thickness of the unitary lightguide 300 in the boundary region 140 is D. The relationship between D3, D4 and D may be as described for lightguide 100. In some embodiments, D5 is less than D. In some embodiments, the third portion 157 of the light redirecting features 150 extends entirely through the thickness of the lightguide. In some embodiments, each of D3, D4 and D5 is at least 0.5, or at least 0.7, or at least 0.8, or at least 0.9 times D. In some embodiments, one or more or all of D3, D4 and D5 are equal to D. In some embodiments, at least one of the light redirecting features 150 is a slot formed in the unitary lightguide 300.

In some embodiments, D3 and/or D4 and/or D5 are different for different light redirecting features 150. For example, one or more depth may vary (e.g., monotonically) along the row of light redirecting features. In some embodiments, D3 and/or D4 and/or D5 are the same or about the same for each light redirecting features 150.

Light redirecting feature 150 may be or may include a recess in the lightguide which may optionally at least partially filled with a material 288. Material 288 may be as described for material 188 and may be air. Any one, two or all of the first, second, and third portions 151, 154, and 157 may be at least partially filled with a filler material having an index of refraction less than (e.g., by at least 0.05, or at least 0.1) an index of refraction of a surrounding region of the lightguide.

In some embodiments, a light source 160 is disposed at the first end 111 of the first lightguide section 110 and a light source 170 is disposed at the second end 112 of the first lightguide section 110 of the lightguide 300 as illustrated in FIG. 3. In some embodiments, when light 161 emitted by the light source 160 enters the unitary lightguide 300 from the first end 111 of the first lightguide section 110, the first portions 151 of the light redirecting features 150 direct the entered light toward the second end 112 of the first lightguide section 110 (e.g., as redirected light 162), and the second portions 154 of the light redirecting features 150 direct the entered light toward and into the second lightguide section 120 (e.g., light 163 is redirected by a second portion 154 toward and into the second lightguide section 120). In some embodiments, the light extractors 130 extract light propagating within the second lightguide section 120, such that the extracted light exits the unitary lightguide 300 from an emission surface of the second lightguide section 120. In some embodiments, when light 181 emitted by the light source 170 enters the unitary lightguide 300 from the second end 112 of the first lightguide section 110, the first portions 151 of the light redirecting features 150 direct the entered light toward the first end 111 of the first lightguide section 110 (e.g., as redirected light 182), and the third portions 157 of the light redirecting features 150 direct the entered light toward and into the second lightguide section 120 (e.g., redirected light 184). In some embodiments, the light extractors 130 extract light propagating within the second lightguide section 120, such that the extracted light exits the unitary lightguide 300 from an emission surface of the second lightguide section 120.

In some embodiments, the light redirecting features have a prism shape. A prism includes a plurality of sides and two bases. The bases may be parallel or may be at an angle. A prism with bases at an angle may be referred to as a truncated prism since the prism can be described as truncated by an intersecting plane at an oblique angle to one of the bases. A prism may also be truncated discontinuously so that a base has discontinuities. For example, a prism may extend generally along an axis between the two bases and the prism may have portions with different depths so that a base includes portions separated from each other along the axis. For example, light redirecting feature 50 has a first base 77, and a second base 79 which is discontinuous and includes a portion from each of portions 51 and 54. As another example, light redirecting feature 150 has a first base 177, and a second base 179 which is discontinuous and includes a portion from each of portions 151, 154 and 157. In some embodiments, there is a taper in the depth from the different portions (51 and 54, or any two adjacent portions or all three of 151, 154 and 157). In some embodiments, D3 and D4 of light redirecting feature 50 are equal or about equal. In some embodiments, any two or all three of D3, D4 and D5 of light redirecting feature 150 are equal or about equal. In some embodiments, a first side of a polygonal prism is shorter and a second side of the polygonal prism is taller along a thickness direction of the unitary lightguide. For example, D3 is shorter and D4 is taller for light redirecting feature 50 and 150 in the embodiments illustrated in FIGS. 2C and 4C.

In some embodiments, the prism is a polygonal prism. In some embodiments, at least one light redirecting features is a concave polygonal prism. A polygonal prism is a prism where at least one of the bases is substantially a polygon. A concave polygonal prism is a polygonal prism where at least one of the bases is substantially a concave polygon. For example, first base 77 and first base 177 are concave polygons. In some embodiments, each side of the prism is substantially planar. Substantially planar can be understood in terms of the radius of curvature of the side. Two principle curvatures can be defined at each point on a surface. For each principle curvature, a principle radius of curvature can be defined as the inverse of the principle curvature. A side of a prism may be described as substantially planar if each principle radius of curvature at each point in greater than 50% of an area of the side is greater than 5 times a largest lateral dimension of the side. In some embodiments, each principle radius of curvature at each point in greater than 60%, or greater than 75%, or greater than 90% of a substantially planar side is greater than 6 times, or greater than 10 times, or greater than 20 times a largest lateral dimension of the side. In some embodiments, a substantially planar side is nominally planar, but may deviate from being planar due to ordinary manufacturing variations, for example. In some embodiments, a substantially planar side is curved. For example, a side may be curved such that each principle radius of curvature at each point of the side, expect possibly near edges of the side, is greater than 10 times a largest lateral dimension of the side. Similarly, a base may be described as substantially a polygon, if the base has edges corresponding to edges of a polygon where the edges are substantially straight. An edge may be described as substantially straight if the radius of curvature at each point in greater than 50% of a length of the edge is greater than 5 times the length of the edge. In some embodiments, the radius of curvature at each point in greater than 60%, or greater than 75%, or greater than 90% of a substantially straight edge is greater than 6 times, or greater than 10 times, or greater than 20 times the length of the edge. In some embodiments, a shape described as substantially a polygon is nominally a polygon, but may deviate from being an ideal polygon due to ordinary manufacturing variations, for example.

Light redirecting features 50 and 150 may be disposed along a row. In some embodiments, the row is one or more of straight, angled, curved and nonlinear. The unitary lightguide can be rectangular or may have other shapes, which may include curves or bends. For example, the lightguide can be made from a film which can be cut into a curved 2-dimensional shape, or a suitably sized portion of the film can be formed (e.g., thermoformed) into a 3-dimensional shape that may be curved about two orthogonal axes (e.g., a bowl shape). In some embodiments, the first portions of the first light redirecting features 50 or 150 in cooperation with the first edge 19 or 119, respectively, confine a portion of light entered into the first lightguide section 10 or 110, respectively, near a first end of the row of light redirecting features, and direct the confined light toward an opposing second end of the row of the spaced apart first light redirecting features, and the second portions 54 or 154, respectively, of the first light redirecting features direct another portion of the entered light into the second lightguide section 20 or 120, respectively.

Figure 5:
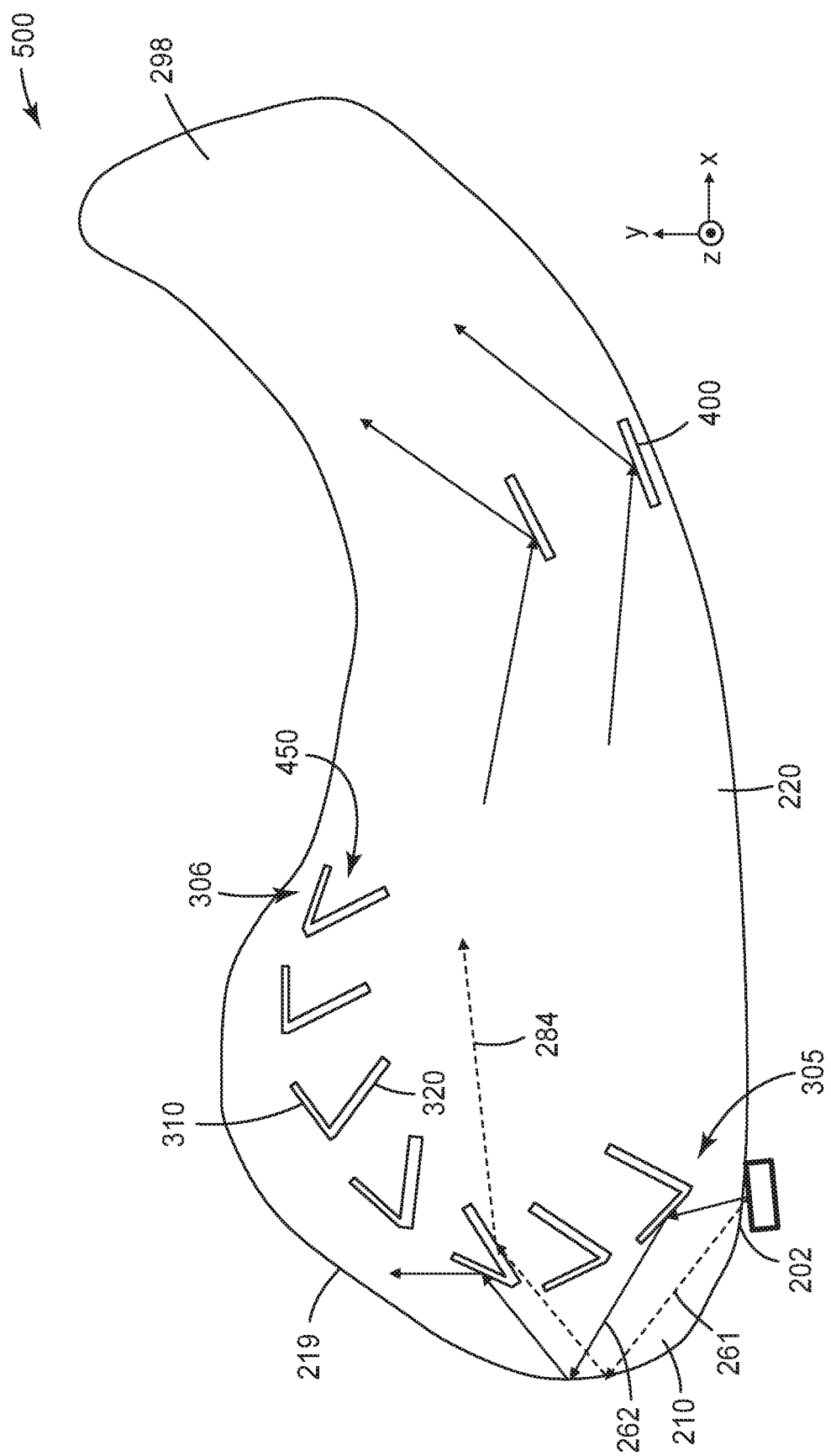
FIG. 5 is a schematic top plan view of a lightguide.

FIG. 5 is a schematic top plan view of a unitary lightguide 500 including a row of spaced apart first light redirecting recesses 450 formed in the unitary lightguide 500. The first light redirecting recesses 450 are spaced from and generally along a first edge 219 of the unitary lightguide 500. The first light redirecting recesses 450 divide the unitary lightguide 500 into a first lightguide section 210 having a major surface having an area A1 and a second lightguide section 220 having a major surface having an area A2, which may be greater than or equal to A1. Lightguide 500 may be planar (e.g., in the x-y plane) or may be curved into the plane of the figure (e.g., first lightguide section 210 may have larger z-coordinates than locations 298).

Each first light redirecting recess 450 including first and second adjacent sides 310 and 320. Each side is substantially perpendicular to the unitary lightguide 500 and extends into the unitary lightguide 500 to a depth that is at least 0.5 times, or at least 0.7 times, or at least 0.8 times, or at least 0.9 times a local thickness of the unitary lightguide 500. For example, the first side 310 may have a depth D3 and the second side 320 may have a depth D4 (see, e.g., FIG. 2C), and each of D3 and D4 may be at least 0.5, or 0.7, or 0.8, or 0.9 times D (see, e.g., FIG. 1B). The first side 310, but not the second side 320 is substantially parallel to the first edge 219. In some embodiments, the first edge 219 is curved as illustrated in FIG. 5.

In some embodiments, for each first light redirecting recess 450, the first and second adjacent sides 310 and 320 define an angle $\theta$ therebetween (see, e.g., FIG. 2A). In some embodiments, the angle $\theta$ is in a range from about 10 degrees to about 70 degrees. In some embodiments, the angle $\theta$ is greater than about 20 degrees.

In some embodiments, when light enters the first lightguide section 210 from an input edge 202 of the unitary lightguide 500 near a first end 305 of the row of the spaced apart first light redirecting recesses 450, the first sides 310 of the first light redirecting recesses 450, in cooperation with the first edge 219, confine a portion 262 of the entered light 261 in the first lightguide section 210 and direct the confined light 262 toward an opposing second end 306 of the row of the spaced apart first light redirecting recesses 450, and the second sides 320 of the first light redirecting recesses 450 direct another portion 284 of the entered light 261 into the second lightguide section 220.

In some embodiments, the unitary lightguide 500 further includes a plurality of second light redirecting recesses 400 formed in the second lightguide section 220 of the unitary lightguide 500 for redirecting light propagating within and along the second lightguide section 220 to different locations 298 in the second lightguide section 220.

In some embodiments, the first lightguide section (e.g., 10, 110, or 210) has a major surface having an area A1, and the second lightguide section (e.g., 20, 120, or 220) has a major surface having an area A2. For example, in the embodiment illustrated in FIG. 3, the area A2 is W2 times L2 and the area A1 is L1 times W1. It is typically preferred that A2 be greater than or equal to A1. In some embodiments, A2 is greater than or equal to 2, or 4, or 5, or 7, or 10 times A1.

In some embodiments, the unitary lightguides described herein may be described as extending along mutually orthogonal first and second directions. In the case of a planar lightguide, for example, the first and second directions may be taken to be the x- and y-directions, for example. In some embodiments, the lightguide is curved and the first and second directions refer to directions along a major surface of the lightguide. For example, in some embodiments, a coordinate system (e.g., orthogonal curvilinear coordinates along a major surface of the lightguide) utilizing first and second coordinates which have mutually orthogonal tangent vectors at the intersections of the coordinate curves are used and the first and second directions are along the curvilinear coordinates. In some embodiments, the lightguide 500 is curved. The first direction of the unitary lightguide 500 may be taken to be along the row of light redirecting recesses 450 and the second direction may be taken to be orthogonal to the first direction and extending predominately from the first lightguide section 210 to the locations 298, for example. In this case, each of the first and second directions may be described as nonlinear or curved.

Figure 6A:
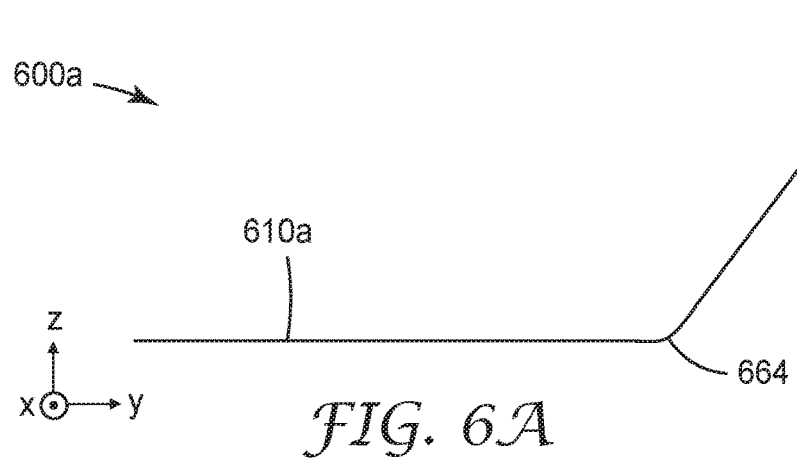
FIGS. 6A-6B are schematic cross-sectional views of unitary lightguides.
Figure 6B:
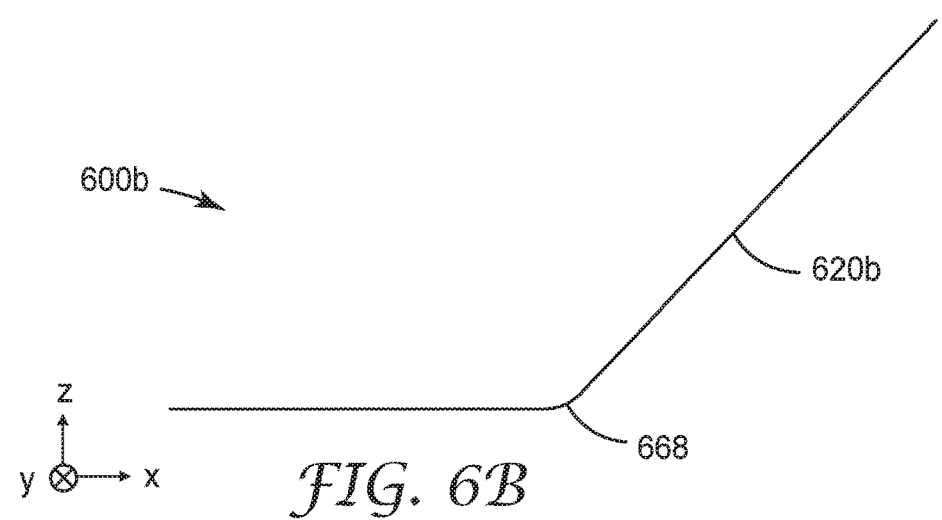

In some embodiments, the lightguide includes one or more bends. FIGS. 6A-6B are schematic cross-sectional views of unitary lightguides 600a and 600b, respectively. In the illustrated embodiments, the lightguides 600a and 600b are thin compared to their length and width and so can be schematically represented by lines. The cross-section of FIG. 6A is along a first lightguide section 610a of lightguide 600a. The first lightguide section 610a extends in a first direction (direction along the bent line in the figure) which includes a bend 664. The cross-section of FIG. 6B is along a length of the lightguide 600b where the length includes a length of a second lightguide section 620b of the lightguide 600b. The second lightguide section 620b extends in a second direction (direction along the bent line in the figure) which includes a bend 668. More generally, in some embodiments, at least one of the first and second directions is nonlinear and/or at least one of the first and second directions includes one or more bends.

Figure 7:
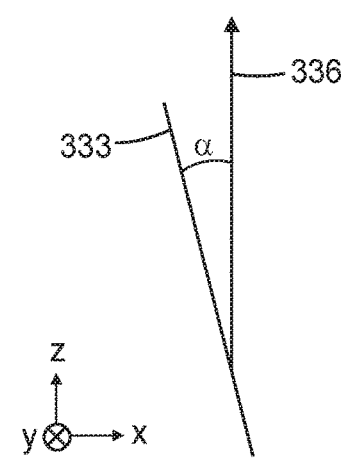
FIGS. 7-8 are schematic illustrations of a surface making an angle with a normal to a lightguide.
Figure 8:
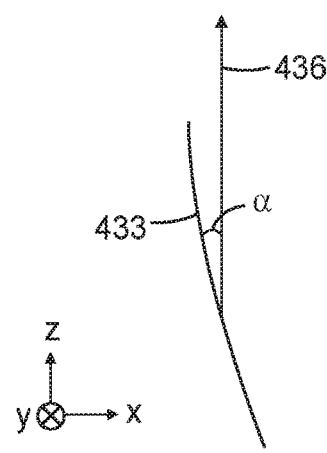

In some embodiments, a first, second and/or a third portion of a light redirecting feature includes at least one substantially vertically oriented planar or substantially surface. A surface is substantially vertically oriented if the surface makes an angle less than 30 degrees with a normal to the unitary lightguide, where the normal refers to a vector in the thickness direction (z-direction) of the lightguide. This angle can be described as the angle between the vector and the projection of the vector onto the surface. If the surface is not planar, this angle can be taken to be the angle between the vector and the projection of the vector onto a plane tangent to the surface at a center of the surface. FIG. 7 is a schematic illustration of a surface 333 making an angle $\alpha$ with a normal 336. Surface 333 may be a planar surface of a first, second and/or a third portion, or a side of a prism, of a light redirecting feature. FIG. 8 is a schematic illustration of a surface 433 making an angle $\alpha$ with a normal 436. Surface 433 may be a surface of a first, second and/or a third portion, or a side of a prism, of a light redirecting feature and normal 436 may be a normal to a unitary lightguide. Surface 433 may be substantially planar, but may have some curvature as described further elsewhere herein. In some embodiments, a surface (e.g., a side of a prism, or a substantially vertically oriented surface of a portion of a light redirecting feature) makes an angle $\alpha$ of less than about 20 degrees, or less than about 15 degrees, or less than about 10 degrees with a normal to the unitary lightguide.

The light extractors (e.g., 30 or 130) may be depressions or protrusions and may be regularly or irregularly arranged. The light extractors 30 of FIG. 1B are protrusions extending from a major surface (the light emission surface 21) of the second lightguide section 20. FIG. 1C is a schematic side view of lightguide 100c which is in many ways similar to lightguide 100 except the light extractors 30c are depressions in a major surface of the second lightguide section 20c of the lightguide 100c opposite the light emission surface 21c. The light 64 is extracted by the light extractors 30c from the light emission surface 21c as light 65c. Light extractors may extract light from the side of the lightguide on which the light extractors are disposed, or may extract light from the opposite side. The light extractors may be included on a same side of the lightguide as the light redirecting features or may be included on an opposite side. In some embodiments, light extractors are included on both opposing major surfaces of the second portion of the lightguide. The light extractors can be made by molding a dot pattern, for example, or by cutting (e.g., laser cutting) dots or grooves, for example, on a major surface of second portion of the lightguide. In some embodiments, the light extractors are configured to extract most or substantially all of the light input into the second section of the lightguide through the light emission surface (e.g., emission surface 21 depicted in FIG. 1B or emission surface 21c depicted in FIG. 1C). In some embodiments, the light extractors are configured such that a portion of the light input into the second section of the lightguide is extracted through the light emission surface and such that a portion of the input light can escape from an end of the second section opposite the first section. In this case, the light extracted through the light emission surface can be utilized for a first application and the escaped light can be utilized for a second application. In some embodiments, the light extractors are omitted so that substantially all light input into the second section exits an end of the second section opposite the first section. In this case, and in other embodiments, the opposing major surfaces of the second section of the lightguide may be unstructured. In some embodiments, a dot pattern or other pattern may be printed onto an otherwise unstructured surface of second portion of a unitary lightguide not otherwise including light extractors in order to extract light from the lightguide.

The lightguides can be made from a glass or a polymer, for example. In some embodiments, the lightguide is flexible. For example, a flexible polymer film may be used to form the lightguide. Suitable polymeric materials include acrylates such as polymethyl methacrylate (PMMA), polycarbonate, and polyurethane, for example. The lightguides can be made by first forming the lightguide (e.g., via extrusion or molding) without light redirecting or light extracting features and then creating the light redirecting and light extracting features through subsequent processing step(s). The light redirecting features and light extractors can be formed by etching, laser ablation, or embossing, for example. Additional processing steps (e.g., cutting a portion of the extruded film to a desired size and shape, and/or thermoforming the film into a desired shape) can be applied before or after the light redirecting features and/or light extractors are formed in the film. Alternatively, the lightguide may be made with the light redirecting features and the light extractors in a molding process.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

Terms such as "substantially" will be understood in the context in which they are used and described in the present description by one of ordinary skill in the art. If the use of "substantially parallel" is not otherwise clear to one of ordinary skill in the art in the context in which it is used and described in the present description, "substantially parallel" will mean within 30 degrees of parallel. Directions or surfaces described as substantially parallel to one another may, in some embodiments, be within 20 degrees, or within 10 degrees of parallel, or may be parallel or nominally parallel. If the use of "substantially perpendicular" or "substantially orthogonal" is not otherwise clear to one of ordinary skill in the art in the context in which it is used and described in the present description, "substantially perpendicular" or "substantially orthogonal" will mean within 30 degrees of perpendicular. Directions or surfaces described as substantially perpendicular to one another may, in some embodiments, be within 20 degrees or within 10 degrees of perpendicular or may be nominally perpendicular. If the use of "substantially vertical" is not otherwise clear to one of ordinary skill in the art in the context in which it is used and described in the present description, "substantially vertical" will mean within 30 degrees of vertical. Directions or surfaces described as substantially vertical may, in some embodiments, be within 20 degrees, or within 10 degrees of vertical, or may be vertical or nominally vertical.

The following is a list of exemplary embodiments of the present description.

Embodiment 1 is a unitary lightguide extending along mutually orthogonal first and second directions and comprising:

a first lightguide section extending along the first direction between opposing first and second ends of the first lightguide section and having a minimum length L1 along the first direction and a maximum width W1 along the second direction, L1/W1≥10;

a second lightguide section extending along the second direction and comprising:

a minimum length L2 along the second direction and a maximum width W2 along the first direction; and a plurality of light extractors for extracting light that would otherwise propagate within and along the second lightguide section; and a boundary region disposed between and joining the first and second lightguide sections, the boundary region substantially coextensive in length with the length of the first lightguide section and the width of the second lightguide section, the boundary region comprising a plurality of spaced apart light redirecting features, each light redirecting feature comprising:

a first portion extending substantially parallel to the first direction between first and second ends of the first portion; and a second portion extending from proximate the first end of the first portion toward the second lightguide section between first and second ends of the second portion and making an angle with the first portion in a range from about 10 degrees to about 70 degrees, wherein the lightguide has a unitary construction.

Embodiment 2 is the unitary lightguide of Embodiment 1, wherein when a light source is disposed at the first end of the first lightguide section, light emitted by the light source enters the unitary lightguide from the first end of the first lightguide section, the first portions of the light redirecting features directing the entered light toward the second end of the first lightguide section, the second portions of the light redirecting features directing the entered light toward and into the second lightguide section, the light extractors extracting light propagating within the second lightguide section, the extracted light exiting the unitary lightguide from an emission surface of the second lightguide section.

Embodiment 3 is the unitary lightguide of Embodiment 1, wherein the first portion of each light redirecting feature is a recess in the boundary region of the unitary lightguide, the recess having a minimum length L3 between the first and second ends of the first portion, a maximum width W3, and a minimum depth D3 along a thickness direction of the unitary lightguide, $L3/W3 \geq 1$, $D3/W3 \geq 1$.

Embodiment 4 is the unitary lightguide of Embodiment 3, wherein $L3/W3 \geq 2$, or $L3/W3 \geq 5$, or $L3/W3 \geq 7$, or $L3/W3 \geq 10$.

Embodiment 5 is the unitary lightguide of any one of Embodiments 3 to 4, wherein $D3/W3 \geq 2$, or $D3/W3 \geq 3$, or $D3/W3 \geq 4$, or $D3/W3 \geq 5$.

Embodiment 6 is the unitary lightguide of any one of Embodiments 3 to 5, wherein a minimum thickness of the unitary lightguide in the boundary region is D, $D3<D$.

Embodiment 7 is the unitary lightguide of any one of Embodiments 1 to 6, wherein at least one light redirecting feature is at least partially embedded in the boundary region.

Embodiment 8 is the unitary lightguide of any one of Embodiments 1 to 6, wherein the boundary region has an index of refraction n1 and each light redirecting feature has an index of refraction n2 less than n1.

Embodiment 9 is the unitary lightguide of any one of Embodiments 1 to 8, wherein the second portion of each light redirecting feature is a recess in the boundary region of the unitary lightguide, the recess having a minimum length L4 between the first and second ends of the second portion, a maximum width W4, and a minimum depth D4 along a thickness direction of the unitary lightguide, $L4/W4 \geq 1$, $D4/W4 \geq 1$.

Embodiment 10 is the unitary lightguide of Embodiment 9, wherein $L4/W4 \geq 2$, or $L4/W4 \geq 5$, or $L4/W4 \geq 7$, or $L4/W4 \geq 10$.

Embodiment 11 is the unitary lightguide of any one of Embodiments 9 to 10, wherein $D4/W4 \geq 2$, or $D4/W4 \geq 3$, or $D4/W4 \geq 4$, or $D4/W4 \geq 5$.

Embodiment 12 is the unitary lightguide of any one of Embodiments 9 to 11, wherein a minimum thickness of the unitary lightguide in the boundary region is D, $D4<D$.

Embodiment 13 is the unitary lightguide of any one of Embodiments 1 to 12, wherein the boundary region has an index of refraction n1 and each light redirecting feature includes a recess at least partially filled a filler material having an index of refraction index n2, $n2<n1$.

Embodiment 14 is the unitary lightguide of any one of Embodiments 1 to 13, wherein the first portion of each light redirecting feature comprises a substantially vertically oriented first planar surface making an angle of less than about 20 degrees with a normal to the unitary lightguide.

Embodiment 15 is the unitary lightguide of any one of Embodiments 1 to 14, wherein each light redirecting feature further comprises a third portion extending from proximate the second end of the first portion toward the second lightguide section between first and second ends of the third portion and making angle with the first portion in a range from about 10 degrees to about 70 degrees.

Embodiment 16 is the unitary lightguide of Embodiment 15, wherein the third portion of each light redirecting feature is a recess in the boundary region of the unitary lightguide, the recess having a minimum length L5 between the first and second ends of the third portion, a maximum width W5, and a minimum depth D5 along a thickness direction of the unitary lightguide, $L5/W5 \geq 1$, $D5/W5 \geq 1$.

Embodiment 17 is the unitary lightguide of Embodiment 16, wherein $L5/W5 \geq 2$, or $L5/W5 \geq 5$, or $L5/W5 \geq 7$, or $L5/W5 \geq 10$.

Embodiment 18 is the unitary lightguide of any one of Embodiments 16 to 17, wherein $D5/W5 \geq 2$, or $D5/W5 \geq 3$, or $D5/W5 \geq 4$, or $D5/W5 \geq 5$.

Embodiment 19 is the unitary lightguide of any one of Embodiments 15 to 18, wherein when a first light source is disposed at the first end of the first lightguide section and a second light source is disposed at a second end of the first lightguide section, light emitted by the first light source enters the unitary lightguide from the first end of the first lightguide section, the first portions of the light redirecting features directing the entered light from the first light source toward the second end of the first lightguide section, the second portions of the light redirecting features directing the entered light from the first light source toward and into the second lightguide section, light emitted by the second light source enters the unitary lightguide from the second end of the first lightguide section, the first portions of the light redirecting features directing the entered light from the second light source toward the first end of the first lightguide section, the third portions of the light redirecting features directing the entered light from the second light source toward and into the second lightguide section, the light extractors extracting light propagating within the second lightguide section, the extracted light exiting the unitary lightguide from an emission surface of the second lightguide section.

Embodiment 20 is the unitary lightguide of any one of Embodiments 1 to 19, wherein at least some of the light extractors in the plurality of light extractors are protrusions extending from a major surface of the second lightguide section.

Embodiment 21 is the unitary lightguide of any one of Embodiments 1 to 20, wherein at least some of the light extractors in the plurality of light extractors are depressions in a major surface of the second lightguide section.

Embodiment 22 is the unitary lightguide of any one of Embodiments 1 to 21, wherein one of the first and second ends of the first lightguide section is smaller in length than the other one of the first and second ends of the first lightguide section.

Embodiment 23 is the unitary lightguide of any one of Embodiments 1 to 22, wherein at least one of the first and second directions comprises one or more bends.

Embodiment 24 is the unitary lightguide of any one of Embodiments 1 to 23, wherein at least one of the first and second directions is nonlinear.

Embodiment 25 is a unitary lightguide comprising:
a first lightguide section having a major surface having an area A1;

a second lightguide section having a major surface having an area A2≥A1; and a row of spaced apart light redirecting features formed in the unitary lightguide and separating the first and second lightguide sections from each other, each light redirecting feature having a polygonal prism shape having a plurality of sides, each side of the polygonal prism substantially planar making an angle of less than about 20 degrees with a normal to the unitary lightguide.

Embodiment 26 is the unitary lightguide of Embodiment 25, wherein A2≥2 A1, or A2≥4 A1, or A2≥5 A1, or A2≥7 A1, or A2≥10 A1.

Embodiment 27 is the unitary lightguide of Embodiment 25 or 26, wherein at least one light redirecting feature in the row of spaced apart light redirecting features is a concave polygonal prism.

Embodiment 28 is the unitary lightguide of any one of Embodiments 25 to 27, wherein at least one light redirecting feature in the row of spaced apart light redirecting features is a slot formed in the unitary lightguide.

Embodiment 29 is the unitary lightguide of any one of Embodiments 25 to 28, wherein the second lightguide section comprises a plurality of light extractors for extracting light that would otherwise propagate within and along the second lightguide section.

Embodiment 30 is the unitary lightguide of Embodiment 29, wherein at least some of the light extractors in the plurality of light extractors are protrusions extending from a major surface of the second lightguide section.

Embodiment 31 is the unitary lightguide of Embodiment 29 or 30, wherein at least some of the light extractors in the plurality of light extractors are depressions in a major surface of the second lightguide section.

Embodiment 32 is the unitary lightguide of any one of Embodiments 25 to 28, wherein the second lightguide section has unstructured opposing major surfaces.

Embodiment 33 is the unitary lightguide of any one of Embodiments 25 to 32, wherein for at least one light redirecting feature, a first side of the polygonal prism is shorter and a second side of the polygonal prism is taller along a thickness direction of the unitary lightguide.

Embodiment 34 is the unitary lightguide of any one of Embodiments 25 to 33, wherein for at least one light redirecting feature, at least one side of the polygonal prism is curved.

Embodiment 35 is the unitary lightguide of any one of Embodiments 25 to 34, wherein the row of spaced apart light redirecting features is a curved row.

Embodiment 36 is the unitary lightguide of any one of Embodiments 25 to 35, wherein the row of spaced apart light redirecting features is a nonlinear row.

Embodiment 37 is a unitary lightguide comprising a row of spaced apart first light redirecting recesses formed in the unitary lightguide spaced from and generally along a first edge of the unitary lightguide, the first light redirecting recesses dividing the lightguide into a first lightguide section having a major surface having an area A1 and a second lightguide section having a major surface having an area A2≥A1, each first light redirecting recess comprising first and second adjacent sides, each side substantially perpendicular to the unitary lightguide and extending into the unitary lightguide to a depth that is at least 0.5 times a local thickness of the unitary lightguide, the first, but not the second, side substantially parallel to the first edge.

Embodiment 38 is the unitary lightguide of Embodiment 37, wherein the first edge is curved.

Embodiment 39 is the unitary lightguide of Embodiment 37 or 38, wherein when light enters the first lightguide section from an input edge of the unitary lightguide near a first end of the row of the spaced apart first light redirecting recesses, the first sides of the first light redirecting recesses, in cooperation with the first edge, confine a portion of the entered light in the first lightguide section and direct the confined light toward an opposing second end of the row of the spaced apart first light redirecting recesses, and the second sides of the first light redirecting recesses direct another portion of the entered light into the second lightguide section.

Embodiment 40 is the unitary lightguide of any one of Embodiments 37 to 39 further comprising a plurality of second light redirecting recesses formed in the second lightguide section of the unitary lightguide for redirecting light propagating within and along the second lightguide section to different locations in the second lightguide section.

Embodiment 41 is the unitary lightguide of any one of Embodiments 37 to 40, wherein each first light redirecting recess is at least partially filled a filler material having an index of refraction less than an index of a surrounding region of the unitary lightguide.

Embodiment 42 is the unitary lightguide of any one of Embodiments 37 to 41, wherein for at least one first light redirecting recess, each of the adjacent first and second sides extends into the unitary lightguide to a depth that is at least 0.7, or at least 0.8, or at least 0.9, times a local thickness of the unitary lightguide.

Embodiment 43 is the unitary lightguide of any one of Embodiments 37 to 42, wherein the second lightguide section comprises a plurality of light extractors for extracting light that would otherwise propagate within and along the second lightguide section.

Embodiment 44 is the unitary lightguide of Embodiment 43, wherein at least some of the light extractors in the plurality of light extractors are protrusion extending from a major surface of the second lightguide section.

Embodiment 45 is the unitary lightguide of Embodiment 43 or 44, wherein at least some of the light extractors in the plurality of light extractors are depressions in a major surface of the second lightguide section.

Embodiment 46 is the unitary lightguide of any one of Embodiments 37 to 42, wherein the second lightguide section has unstructured opposing major surfaces.

Embodiment 47 is the unitary lightguide of any one of Embodiments 37 to 46, wherein for each first light redirecting recess, the first and second adjacent sides define an angle greater than about 20 degrees therebetween.

Example

A lightguide similar to lightguide 100 of FIG. 1A was made by extruding a polyurethane film having a thickness of about 1.2 mm, cutting a rectangular sheet having a width and length of about 190 mm by 480 mm from the film, and using a $CO_2$ laser to define light redirecting features and light extractors in the sheet. The lightguide had a first lightguide section corresponding to first lightguide section 10 of lightguide 100, a second lightguide section corresponding to second lightguide section 20 of lightguide 100, and a row of light redirecting features corresponding to light redirecting features 50 in a boundary region between the first and second lightguide sections. The lightguide had a width of about 190 mm (corresponding to L1 and W2 of FIG. 1A) and a length of about 480 mm. The width of the first end (corresponding to first end 11) of the first lightguide section was about 15 mm and the width of the second end (corresponding to second end 12) of the first lightguide section was about approximately zero (less than about 1 mm). The light redirecting features were V-cuts made all the way through the thickness of the lightguide using the $CO_2$ laser. The light redirecting features had first and second portions corresponding to first portion 51 and second portion 54 of the light redirecting features 50 of the lightguide 100. The length L3 of the first portion was about 10 mm and the length L4 of the second portion was about 8 mm. The widths W3 and W4 of the first and second portions were approximately 0.1 to 0.2 mm. The angle θ between the first and second portions was about 60 degrees. Light extractors were formed in the second lightguide section by cutting dots into the sheet using the $CO_2$ laser. The dots had a depth of about 0.15 mm. The dots were irregularly arranged and denser farther from the first lightguide section than closer to the first lightguide section. The first lightguide section had a surface area A1 of about 14 $cm^2$ and the second lightguide section had a surface area A2 of about 900 $cm^2$.

A red laser diode with a fiber pigtail was used as a light source at a corner of the lightguide (corresponding to light source 60 adjacent the first end 11 of the first lightguide section 10 of lightguide 100). It was found that a substantially uniform illumination over most of the area of the second lightguide section was provided by using the single laser diode light source at the corner.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A unitary lightguide extending along mutually orthogonal first and second directions and comprising:
   a first lightguide section extending along the first direction between opposing first and second ends of the first lightguide section and having a minimum length L1 along the first direction and a maximum width W1 along the second direction, L1/W1≥10;
   a second lightguide section extending along the second direction and comprising:
   a minimum length L2 along the second direction and a maximum width W2 along the first direction; and
   a plurality of light extractors for extracting light that would otherwise propagate within and along the second lightguide section; and
   a boundary region disposed between and joining the first and second lightguide sections, the boundary region substantially coextensive in length with the length of the first lightguide section and the width of the second lightguide section, the boundary region comprising a plurality of spaced apart light redirecting features, each light redirecting feature comprising:
   a first portion having a prism shape and extending substantially parallel to the first direction between first and second ends of the first portion; and
   a second portion having a prism shape and extending from proximate the first end of the first portion toward the second lightguide section between first and second ends of the second portion and making an angle with the first portion in a range from about 10 degrees to about 70 degrees, wherein the lightguide has a unitary construction.

2. The unitary lightguide of claim 1, wherein when a light source is disposed at the first end of the first lightguide section, light emitted by the light source enters the unitary lightguide from the first end of the first lightguide section, the first portions of the light redirecting features directing the entered light toward the second end of the first lightguide section, the second portions of the light redirecting features directing the entered light toward and into the second lightguide section, the light extractors extracting light propagating within the second lightguide section, the extracted light exiting the unitary lightguide from an emission surface of the second lightguide section.

3. The unitary lightguide of claim 1, wherein the first portion of each light redirecting feature is a recess in the boundary region of the unitary lightguide, the recess having a minimum length L3 between the first and second ends of the first portion, a maximum width W3, and a minimum depth D3 along a thickness direction of the unitary lightguide, L3/W3≥1, D3/W3≥1.

4. The unitary lightguide of claim 1, wherein at least one light redirecting feature is at least partially embedded in the boundary region.

5. The unitary lightguide of claim 1, wherein the second portion of each light redirecting feature is a recess in the boundary region of the unitary lightguide, the recess having a minimum length L4 between the first and second ends of the second portion, a maximum width W4, and a minimum depth D4 along a thickness direction of the unitary lightguide, L4/W4≥1, D4/W4≥1.

6. The unitary lightguide of claim 1, wherein the first portion of each light redirecting feature comprises a substantially vertically oriented first planar surface making an angle of less than about 20 degrees with a normal to the unitary lightguide.

7. The unitary lightguide of claim 1, wherein each light redirecting feature further comprises a third portion extending from proximate the second end of the first portion toward the second lightguide section between first and second ends of the third portion and making angle with the first portion in a range from about 10 degrees to about 70 degrees.

8. The unitary lightguide of claim 7, wherein the third portion of each light redirecting feature is a recess in the boundary region of the unitary lightguide, the recess having a minimum length L5 between the first and second ends of the third portion, a maximum width W5, and a minimum depth D5 along a thickness direction of the unitary lightguide, L5/W5≥1, D5/W5≥1.

9. The unitary lightguide of claim 7, wherein when a first light source is disposed at the first end of the first lightguide section and a second light source is disposed at a second end of the first lightguide section,
   light emitted by the first light source enters the unitary lightguide from the first end of the first lightguide section, the first portions of the light redirecting features directing the entered light from the first light source toward the second end of the first lightguide section, the second portions of the light redirecting features directing the entered light from the first light source toward and into the second lightguide section,
   light emitted by the second light source enters the unitary lightguide from the second end of the first lightguide section, the first portions of the light redirecting features directing the entered light from the second light source toward the first end of the first lightguide section, the third portions of the light redirecting features directing the entered light from the second light source toward and into the second lightguide section, the light extractors extracting light propagating within the second lightguide section, the extracted light exiting the unitary lightguide from an emission surface of the second lightguide section.

10. A unitary lightguide comprising:
a first lightguide section having a major surface having an area A1;
a second lightguide section having a major surface having an area $A2 \geq A1$; and
a row of spaced apart light redirecting features formed in the unitary lightguide and separating the first and second lightguide sections from each other, each light redirecting feature having a polygonal prism shape comprising a first portion and a second portion and having a plurality of sides, each side of the polygonal prism substantially planar making an angle of less than about 20 degrees with a normal to the unitary lightguide, the second portion of the polygonal prism shape making an angle with the first portion in a range from about 10 degrees to about 70 degrees.

11. The unitary lightguide of claim 10, wherein at least one light redirecting feature in the row of spaced apart light redirecting features is a concave polygonal prism.

12. The unitary lightguide of claim 10, wherein at least one light redirecting feature in the row of spaced apart light redirecting features is a slot formed in the unitary lightguide.

13. The unitary lightguide of claim 10, wherein the second lightguide section comprises a plurality of light extractors for extracting light that would otherwise propagate within and along the second lightguide section.

14. The unitary lightguide of claim 10, wherein for at least one light redirecting feature, a first side of the polygonal prism is shorter and a second side of the polygonal prism is taller along a thickness direction of the unitary lightguide.

15. A unitary lightguide comprising a row of spaced apart first light redirecting recesses formed in the unitary lightguide spaced from and generally along a first edge of the unitary lightguide, the first light redirecting recesses dividing the lightguide into a first lightguide section having a major surface having an area A1 and a second lightguide section having a major surface having an area $A2 \geq A1$, each first light redirecting recess comprising first and second adjacent portions, each portion having a prism shape and substantially perpendicular to the unitary lightguide and extending into the unitary lightguide to a depth that is at least 0.5 times a local thickness of the unitary lightguide, the first, but not the second, portion substantially parallel to the first edge.

16. The unitary lightguide of claim 15, wherein for each first light redirecting recess, the first and second adjacent portions define an angle greater than about 20 degrees therebetween.

17. The unitary lightguide of claim 15, wherein when light enters the first lightguide section from an input edge of the unitary lightguide near a first end of the row of the spaced apart first light redirecting recesses, the first portions of the first light redirecting recesses, in cooperation with the first edge, confine a portion of the entered light in the first lightguide section and direct the confined light toward an opposing second end of the row of the spaced apart first light redirecting recesses, and the second portions of the first light redirecting recesses direct another portion of the entered light into the second lightguide section.

18. The unitary lightguide of claim 15 further comprising a plurality of second light redirecting recesses formed in the second lightguide section of the unitary lightguide for redirecting light propagating within and along the second lightguide section to different locations in the second lightguide section.

19. The unitary lightguide of claim 15, wherein for at least one first light redirecting recess, each of the adjacent first and second portions extends into the unitary lightguide to a depth that is at least 0.7 times a local thickness of the unitary lightguide.

20. The unitary lightguide of claim 15, wherein the second lightguide section comprises a plurality of light extractors for extracting light that would otherwise propagate within and along the second lightguide section.

* * * * *